Oct. 31, 1939. A. H. R. FEDDEN ET AL 2,178,017
FRICTION CLUTCH
Filed March 24, 1939
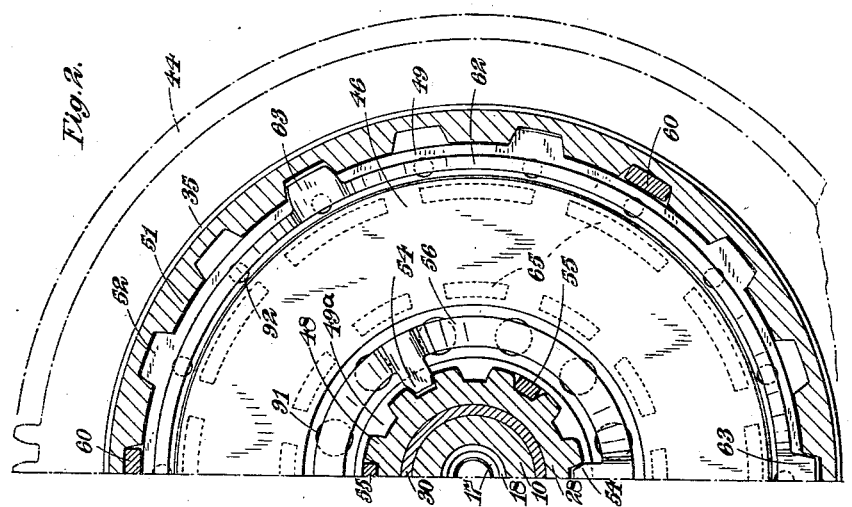
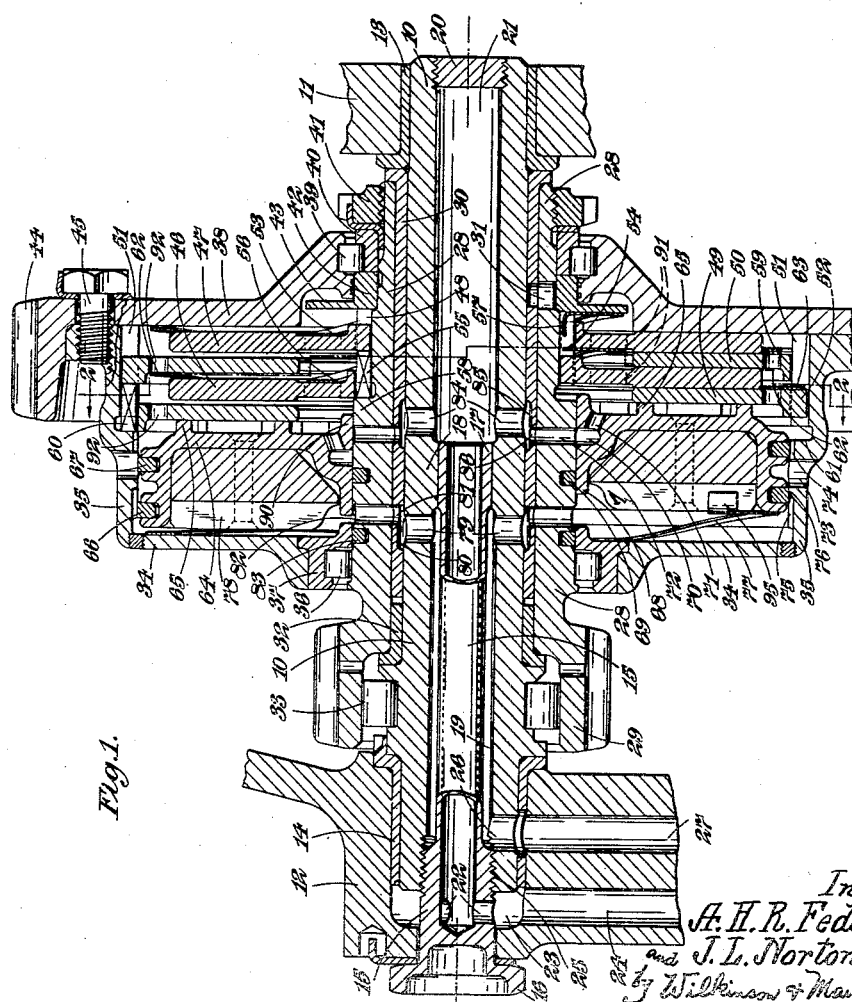
Inventors
A. H. R. Fedden
and J. L. Norton
by Wilkinson & Mawhinney
Attorneys Patented Oct. 31, 1939

2,178,017

UNITED STATES PATENT OFFICE 2,178,017

FRICTION CLUTCH

Alfred Hubert Roy Fedden and James Lansdowne Norton, Bristol, England, assignors to The Bristol Aeroplane Company Limited, Bristol, England, a British company Application March 24, 1939, Serial No. 263,978
In Great Britain April 9, 1938

7 Claims. (Cl. 192—86)

This invention is for improvements in friction-clutch mechanism of the kind in which the engagement and/or disengagement of the clutch is effected by a reciprocating hydraulic motor. The object of the invention is to provide a compact design of clutch-mechanism of this kind.

According to the invention, friction-clutch mechanism of the kind described comprises a hydraulic cylinder, a relatively reciprocable piston within the cylinder, which piston divides the cylinder space into two chambers, one on each side of the piston, co-operating clutch members housed in one of said chambers so as to be immersed in the pressure-liquid admitted to that side of the piston, and means operated automatically by relative movement between the cylinder and piston to drain the said chamber of liquid, at least when the said clutch members are disengaged. By housing the clutch members within the hydraulic cylinder a very compact arrangement of the parts is made possible. However, but for the present invention, the clutch members would be immersed in the pressure liquid when the clutch members were disengaged and such immersion would give rise to drag between them. Preferably the arrangement is such that, to disengage the clutch, liquid is admitted to the chamber containing the clutch members.

The liquid may be drained away through a port which may or may not be controlled, or may be partly controlled, by the relative movement between the cylinder and piston. In order to cut off the admission of liquid to the chamber when the disengaging movement has ceased the said relative movement may also close an inlet port in the cylinder or piston.

The mechanism preferably comprises a driving shaft, a driven gear rotatably mounted on the said shaft, a hydraulic cylinder carried by the said driven gear, clutch members within the cylinder, a piston within the cylinder for engaging the clutch members, and means for draining liquid from the cylinder when the clutch is engaged. The mechanism preferably comprises a fixed spindle within the shaft, a space at one end of the spindle communicating with one end of the cylinder, a space at the other end communicating with the other end of the cylinder and conduits leading into said spaces both from one end of the spindle.

A specific embodiment of the invention will now be described by way of example with reference to the accompanying drawing:

Figure 1 is a sectional elevation of a clutch according to the invention, the top half of the drawing showing the parts in the positions they assume when the clutch is disengaged, and the bottom half of the drawing showing the same parts in the positions they assume when the clutch is engaged, and Figure 2 is a sectional elevation on the line 2—2 of Figure 1 showing one half, only, of the assemblage.

As shown in the drawing, a fixed hollow spindle 10 is mounted in frame members 11, 12, being separated therefrom by bushings 13, 14. At the left-hand end of the spindle 10 it is engaged by a tubular plug 15 screw-threaded into it and formed with a nut-portion 16. At its right-hand end the plug 15 is formed with an enlargement 17 which makes fluid-tight engagement with a portion 18, of the spindle 10, of reduced diameter. To the left of these interengaging portions it will be seen that the tube 15 is spaced away from the surrounding bore of the spindle so as to leave a tubular space 19. This space constitutes an oil conduit as described below. At its right-hand end, the spindle 10 is closed by a plug 20 so as to form a space 21 in communication with the interior of the tube 15.

At its left-hand end, the wall of the tube 15 is formed with radial passages 22 communicating with a surrounding annular chamber 23 into which a conduit 24 leads, the conduit being cast in the frame member 12. To the right of the screw-threads 25, by which the tube 15 engages the spindle 10, the spindle is formed with a radial port 26 which communicates, by way of a co-operating port in the bushing 14, with a conduit 27 also cast in the frame member 12. From the above description it will be clear that the conduit 24 communicates by way of the chamber 23, the ports 22 and the bore of the tube 15 with the space 21 at the right-hand end of the spindle; and that the conduit 27 communicates by way of the port 26 with the tubular space 19 at the left-hand end of the spindle.

Surrounding the spindle 10 is a tubular shaft 28 which is integrally formed at its left-hand end with a pinion 29 by which it is driven. A lining 30 of bearing metal is inserted from the right-hand end and is locked so as to rotate with the shaft by means of a dowel 31. At its left-hand end a similar lining 32 is provided, being secured to the shaft 28 by a similar dowel (not shown). A roller bearing 33 is provided between the pinion 29 and the spindle 10 for the left-hand end of the shaft 28; the bearing surface for the remainder of the shaft is afforded by the internal surface of the bushings 30 and 32.

Rotatably mounted upon the shaft 28 is a hydraulic cylinder comprising two parts; a left-hand annular wall 34 which has integrally formed with it a cylindrical wall 35 and which is borne on the shaft by a roller bearing 36 engaging an outer race 37, and a right-hand annular wall 38 which is borne on the shaft by a roller bearing 39 having an inner race 40 locked on the shaft by means of a nut 41 on the right-hand side, between which and a collar 42 on the left-hand side the race is clamped. The collar 42 abuts against a shoulder on the shaft 28 and is formed with a plate-like portion 43 the purpose of which will be described below. The wall 38 of the cylinder is integrally formed with gear-teeth 44 which transmit the drive when the clutch is engaged. The wall 38 is attached to the cylindrical wall 35 of the other part of the cylinder by suitable bolts 45, only one of which is shown.

The clutch-plates are situated at the right-hand end of the hydraulic cylinder above described. The driving clutch-plates 46, 47, are annular in shape and at their inner edges are formed with castellations to engage cooperating splines 48 formed on the shaft 28. The castellations 49a of the clutch-plate 46 are shown in Figure 2 and the castellations on the clutch-plate 47 are similar. Thus, the clutch-plates 46 and 47 are slidable along the shaft 28 but are non-rotatable with respect to it.

The driven clutch-plates 49, 50 are formed with castellations which inter-engage with splines 51 cut on the internal wall of the cylindrical wall 35 of the hydraulic cylinder. The gaps between the splines 51 are engaged alternately by the castellations 52 (Figure 2) on the clutch-plate 49, and by similar castellations (not shown in Figure 2) on the clutch-plate 50. Thus, the plates 49 and 50 are slidable along the cylinder wall 35 but are non-rotatable with respect thereto.

Means for ensuring separation of the clutch-plates when the clutch is disengaged, and for limiting their separating movement, will now be described. Between the annular plate 43 of the collar 42 and the clutch-plate 47 is a spring 53 in the form of a flat circular ring which is waved in the view of Figure 1 so as to be compressible by flattening in a direction longitudinally of the axis of the clutch. The effect of the spring 53 is to tend to press the plate 47 towards the left, but its movement in this direction is limited by means of stops 55, of which there may be three symmetrically arranged around the shaft axis, each lying between two adjacent splines 48 as shown in Figure 2. The clutch-plate 46 is pressed towards the left by means of a wavy spring 56 lying between the clutch-plates 46 and 47. The spring 56 is formed with inward projections 54 which lie between adjacent splines 48 on the shaft 28 as shown in Figure 2, whereby the spring is nonrotatable with respect to the shaft. The spring 53 between the clutch-plate 47 and the plate 43 is similarly formed with such projections which are indicated by the reference 57 in Figure 1 but are not visible in Figure 2. The movement of the clutch-plate 46 towards the left is limited by the engagement of its castellations 49a with the unsplined shoulder 58 on the shaft 28, which shoulder also forms an abutment for the stops 55.

The driven clutch-plate 50 is pressed towards the left by a double wavy spring 59 lying between it and the annular wall 38. Movement of this clutch-plate towards the left is limited by stops 60 each arranged between two adjacent splines 51 on the cylindrical wall 35, as shown in Figure 2, and each abutting at its left-hand end against an internal flange 61 (Figure 1). The other driven clutch-plate 49 is pressed towards the left by means of a wavy spring 62 which lies between it and the clutch-plate 50. The spring is formed at one or more points on its outer edge with outwardly extending projections 63, each of which lies between adjacent splines 51 on the cylindrical wall of the hydraulic cylinder so as to lock the spring against rotation with respect to the cylinder. Similar projections may be provided on the springs 59.

Movement of the clutch-plate 49 towards the left is unlimited except by the hydraulic piston which will now be described.

The piston 64 is formed on its right-hand face with a series of arcuate projections 65 to abut against the driven clutch-plate 49. The outer wall of the piston carries piston rings 66, 67, which co-operate with grooves and ports, in the cylinder wall, described below. The inner wall 68 of the piston slides on a packing ring 69 housed in a groove in the shaft 28. The wall 68, together with a tubular extension 90 on the right-hand side of the piston, constitute a slide-valve, the two tubular portions being separated by a groove 70. The groove 70 communicates by ports 71 with the right-hand side of the piston and co-operates with a series of radial holes 72 in the shaft 28 in a manner described below.

The cylindrical wall 35 of the hydraulic cylinder is formed with a plurality of ports 73; for example, there may be six such ports, symmetrically arranged. At the right-hand side of the ports 73 the inner wall of the cylinder is cut with two grooves 74 each of which leads into an adjacent port 73. At the left-hand side the wall of the cylinder is cut with grooves 75 which, however, do not lead into the adjacent ports 73 but are separated therefrom by an uninterrupted land 76. The grooves 74 and 75 provide leakage paths of restricted cross-section for a purpose which will appear below.

The piston 64 is pressed towards the right by a wavy spring 77 lying between it and the annular wall 34 of the hydraulic cylinder, the spring being keyed against rotation with respect to the piston by an inturned tongue 95 which engages a filling 78 of light metal riveted to the left-hand side of the piston in order to reduce the volume of the left-hand chamber.

The tubular space 19 in the spindle 10 leads by way of radial ports 79 in the spindle into a continuous groove 80 cut on the inner wall of the lining 30. This lining is formed with ports 81 which lead into radial holes 82 in the shaft 28, the holes opening into the hydraulic cylinder on the left-hand side of the piston. Leakage from this side of the piston is prevented by a packing ring 83 housed in a groove in the shaft and engaging a flange formed on the roller race 37.

The space 21 at the right-hand end of the spindle communicates through radial holes 84 formed in the spindle 10 with a continuous groove 85 formed in the lining 30 which communicates through ports 86 with the radial holes 72, above described, in the shaft 28.

The purpose of making the grooves 80 and 85 rather longer, in a direction parallel with the axis of the spindle 10, than appears necessary, is to provide a separate supply of oil to the various surfaces requiring lubrication. The lubrication system, however, forms no part of the invention and is therefore not illustrated in the drawing.

The operation of the apparatus above described is as follows: If the clutch is disengaged, as shown in the top half of Figure 1, and it is required to engage the clutch, oil under pressure is admitted to the conduit 27 by the operation of a suitable valve (not shown), and the conduit 24 is connected to a drain. The oil under pressure flows from the space 19 through the ports 79, 82 to the left-hand side of the piston. Slight leakage occurs along the grooves 75 and out through the holes 73 in the cylinder wall, but such leakage is not sufficient to cause any material delay in the building up of pressure on the left-hand side of the piston. Such pressure therefore forces the piston to the right; the projections 65 engage the clutch-plate 49 whereby all four clutch-plates are pressed together as shown at the bottom of Figure 1. When the piston reaches the end of its stroke the piston ring 66 engages the land 76 whereby further leakage of oil along the grooves 75 is prevented. When the parts are in the position shown at the bottom of Figure 1, the right-hand chamber is empty of oil (for reasons explained below), so that the centrifugal force on the oil on the left of the piston augments the clutch-engaging force. Any oil which leaks into the right-hand chamber, when the clutch is engaged, will leak out along the grooves 74. There is thus no tendency for oil to accumulate in the right-hand chamber.

When the clutch is engaged, it will be seen that the groove 70 in the piston registers with the ports 72 in the shaft 28. If it is now required to disengage the clutch oil under pressure is admitted to the conduit 24 and the conduit 27 is connected to the drain. The oil under pressure flows from the chamber 21 through the ports 72 into the groove 70, along the ports 71 in the piston to the right-hand chamber. The oil fills the chamber containing the clutch-plates and tends to leak away along the two grooves 74 and through the holes 73. However, the outlet area which these grooves provide is too small to cause any material delay in the building up of pressure in the right-hand chamber so that the piston is moved towards the left. The various springs above described cause the clutch-plates to separate whereby the clutch is disengaged.

The slide valve 90, when the piston approaches the end of its stroke towards the left, closes the outlet from the radial ports 72, whereby the flow of oil into the right-hand chamber ceases. At the same time the piston ring 67 opens the comparatively large holes 73 in the cylindrical wall 35, whereby substantially all the oil in the right-hand chamber is discharged through these holes. The flow of oil from between the clutch-plates to the holes 73 is facilitated by perforating the clutch-plates 46 and 47 as shown at 91 and the clutch-plates 49 and 50 as shown at 92, and by the spacing apart of the projections 65 in a peripheral direction as shown in Figure 2. Thus, shortly after the parts have reached the positions shown in the top half of Figure 1, the right-hand chamber will be almost completely drained of oil so that the movement of the driving clutch-plates 46, 47, with respect to the now stationary driven clutch-plates 49, 50, will not be impeded by the drag of films of oil between them.

It will be understood that the gear-wheel 44 is now stationary although the shaft 28 and associated parts continue to rotate.

If, for any reason other than deliberate actuation of the control valve, the piston now tends to move towards the right so as to engage the clutch, the left-hand edge of the slide valve 90 again opens the ports 72 and the piston ring 67 closes the holes 73 except for the narrow route along the grooves 74, so that oil is again admitted to the right-hand chamber and the piston pressed back to the position shown in the top half of Figure 1.

When the clutch is being disengaged as above described, the oil from the left-hand chamber is forced out by the piston through the ports 82, 79, and along the duct 27. When the parts reach the positions shown in the top half of Figure 1, the piston ring 66 registers with the grooved portions 75 of the cylinder wall so that oil remaining in the left-hand chamber leaks away along the grooves 75 and through the holes 73. Thus, when the clutch has been disengaged, both chambers are empty of oil.

The invention may be applied to a supercharger, driven by gearing from an internal-combustion engine, in which the supercharger drive is required to be engaged and disengaged at will. In particular, the clutch according to the invention may be incorporated in the drive to the first-stage blower of a two-stage supercharging system. The gearing is contained in an outer casing which receives the oil discharged through the holes 73 and returns it to a sump.

We claim:

1. Friction-clutch mechanism comprising a hydraulic cylinder rotatably mounted upon a coaxial shaft, a piston slidable along the shaft within the cylinder, a clutch-member non-rotatably mounted with respect to the cylinder and another clutch member non-rotatably mounted with respect to the shaft, the said clutch members being so arranged in a chamber between the piston and one end of the cylinder as to be engaged by movement of the piston towards that end, one or more inlet ports in the said shaft for the admission of pressure-liquid to the chamber and one or more outlet ports in the cylinder for the discharge of liquid from the chamber, the said inlet and outlet ports being so arranged in relation to the piston as to be closed and opened respectively when the clutch has been disengaged.

2. Friction-clutch mechanism comprising a hydraulic cylinder, a relatively reciprocable piston within the cylinder, which piston divides the cylinder space into two chambers one on each side of the piston, co-operating clutch members housed in one of said chambers, means for admitting pressure-liquid to said chamber to disengage the clutch, and means operated automatically by relative movement by the piston and cylinder to drain the said chamber of liquid, both when the clutch has been disengaged and when the clutch has been engaged.

3. Friction-clutch mechanism comprising a hydraulic cylinder rotatably mounted upon a coaxial shaft, a piston slidable along the shaft within the cylinder, a clutch member non-rotatably mounted with respect to the cylinder and another clutch member non-rotatably mounted with respect to the shaft, the said clutch members being so arranged in a chamber between the piston and one end of the cylinder as to be engaged by movement of the piston towards that end, one or more inlet ports in the said shaft for the admission of pressure-liquid to the chamber, and a sleeve around the shaft, carried by the piston and formed with an internal groove communicating with the clutch-side of the piston by one or more ports in the piston, whereby the said groove registers with the said inlet ports when the clutch is engaged, so that liquid may be admitted to disengage the clutch, and whereby the sleeve closes the said ports when the clutch is disengaged so that the chamber may be drained of liquid.

4. Friction-clutch mechanism comprising a hydraulic cylinder rotatably mounted upon a coaxial shaft, a piston slidable along the shaft within the cylinder, a clutch member non-rotatably mounted with respect to the cylinder and another clutch member non-rotatably mounted with respect to the shaft, the said clutch members being so arranged in a chamber between the piston and one end of the cylinder as to be engaged by movement of the piston towards that end, one or more permanently-open inlet ports from the shaft to a chamber between the piston and the other end of the cylinder, and one or more outlet conduits of restricted cross-section from said chamber, said outlet conduits being so arranged as to be closed by the piston when the piston reaches its clutch-engaging position.

5. Friction-clutch mechanism comprising a hydraulic cylinder rotatably mounted upon a coaxial shaft, a piston slidable along the shaft within the cylinder, a clutch member non-rotatably mounted with respect to the cylinder and another clutch member non-rotatably mounted with respect to the shaft, the said clutch members being so arranged in a chamber between the piston and one end of the cylinder as to be engaged by movement of the piston towards that end, one or more grooves of restricted cross-section formed in the cylinder wall, which grooves, when the clutch is disengaged, communicate with outlet ports at a point in the wall of the cylinder between the piston and the other end of the cylinder, and a piston-ring which when the clutch is engaged, co-operates with an ungrooved portion of the cylinder wall lying between the said grooves at the said ports.

6. Clutch-mechanism as claimed in claim 1, wherein the said chamber is permanently open to the said outlet ports through conduits of restricted cross-section whereby liquid is prevented from accumulating in the chamber when the clutch is engaged.

7. Clutch-mechanism as claimed in claim 1, comprising a fixed spindle within the said shaft, a space at one end of the spindle communicating with one end of the cylinder, a space at the other and communicating with the other end of the cylinder and conduits leading into said spaces both from one end of the spindle.

ALFRED HUBERT ROY FEDDEN.
JAMES LANSDOWNE NORTON.